United States Patent [19]

Seibert

[11] 3,735,993

[45] May 29, 1973

[54] SELF-RELEASE AND RELOAD TOOLING DEVICE

[76] Inventor: Warren F. Seibert, c/o Seibert and Sons, Inc., Chenoa, Ill. 61726

[22] Filed: Apr. 26, 1971

[21] Appl. No.: 137,175

[52] U.S. Cl. .................................. 279/1 B, 279/75
[51] Int. Cl. ............................................ B23b 31/22
[58] Field of Search .......................... 279/1 B, 89, 90, 279/75

[56] References Cited

UNITED STATES PATENTS

| | | | |
|---|---|---|---|
| 2,990,188 | 6/1961 | Better et al. | 279/75 |
| 3,583,715 | 6/1971 | Jahri | 279/85 X |

FOREIGN PATENTS OR APPLICATIONS

| | | | |
|---|---|---|---|
| 342,678 | 1931 | Great Britain | 279/75 |

*Primary Examiner*—Andrew R. Juhasz
*Attorney*—Keith J. Kulie

[57] ABSTRACT

A self-release and reload tooling device having a tool body, an adaptor nut for receiving a tool implement, a spring biased outer sleeve, and a spring biased release, whereby upon insertion of the adaptor nut in the tool body, the spring biased release is actuated freeing the outer sleeve which locks the adaptor nut to the tool body, and where upon manually sliding the outer sleeve back, the spring biased release is reset permitting removal of the adaptor nut, with the tool body then remaining in a position of readiness to receive and lock the next adaptor nut inserted in the tool body.

11 Claims, 10 Drawing Figures

Patented May 29, 1973
3,735,993
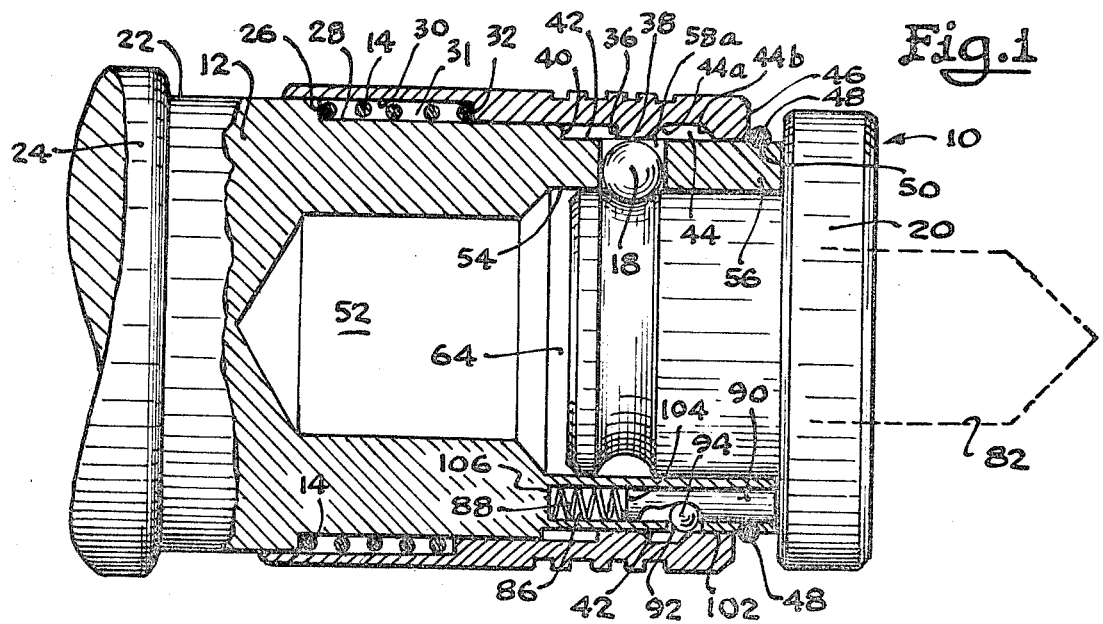
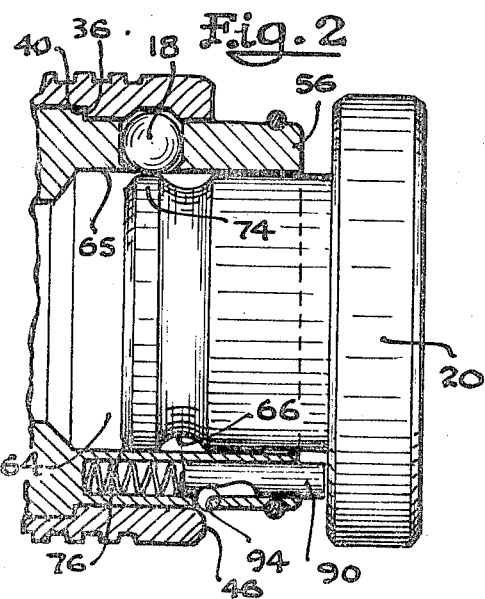
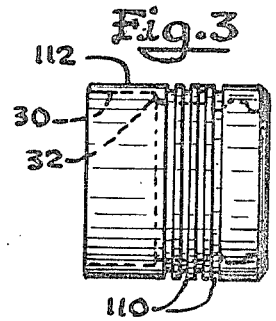
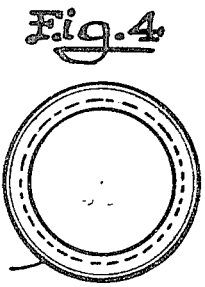
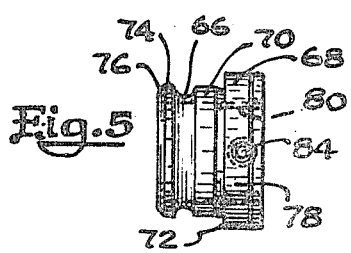
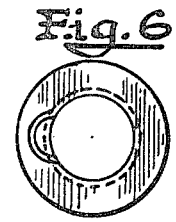
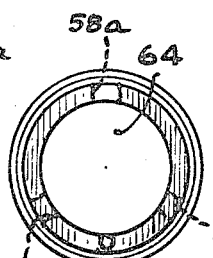
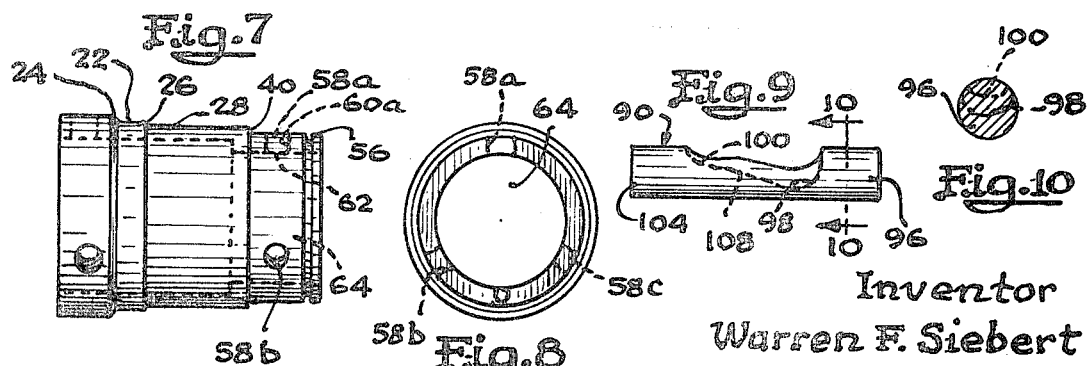
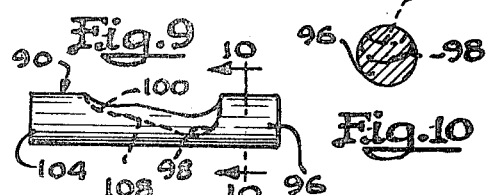
Inventor
Warren F. Siebert
By Keith J. Kulie
Attorney

SELF-RELEASE AND RELOAD TOOLING DEVICE

The present invention relates to an improved device for securing tool implements to a tool body. There are many devices employed for removeably securing a tool implement to a tool body or drive mechanism. These devices usually involve threadably interlockable adaptor parts or devices which secure the tool implement with set screws or the like, to the tool body. While these means are effective in accomplishing the ultimate result of securing the tool implement, they are not ideal, for a relatively large amount of time is lost and skill is necessary to properly engage and disengage these adaptor devices. Also, separate tools, some made especially for the adaptor device, may be necessary to properly engage and disengage these devices.

The present invention is directed to providing an improved self-release and reload adaptor device for securing a tool implement to a tool body and is useful in any situation where a number of different tool implements are to be used at different times in connection with a single tool body or drive mechanism. The self-release device is completely self-securing and self-releaseable and as such requires no additional equipment to place it in operation or remove it from service. When no tool implement is attached to the tool body the device of the present invention remains in a position of readiness so that upon insertion of an adaptor nut into the tool body the present device provides a simple, convenient, labor and time saving means for removeably securing tool implements to a tool body.

It is accordingly, a general object of the present invention to provide an improved device for securing tool implements to a tool body.

Another object of the present invention resides in the provision of an improved device for automatically locking an adaptor nut and tool implement to the tool body, upon insertion of the adaptor nut in the tool body.

Another object of the present invention resides in the provision of an improved device for automatically releasing the adaptor nut and tool impliment from the tool body.

A further object of the present invention resides in the provision for maintaining the tool body in a position or readiness to receive an adaptor nut and tool implement when no adaptor nut is attached to the tool body.

Another object of the present invention is the provision of a simple self-contained locking and releasing device eliminating the necessity of separate tools to lock and release the adaptor nut on the tool body.

Other objects of the present invention include the provision of an apparatus requiring only one simple manual movement of the hand to lock the adaptor nut and tool implement to the tool body, and only one simple manual movement of the hand to release the adaptor nut from the tool body; the use of simple mechanical elements for the locking and releasing portions of the device eliminating any complicated locking and releasing mechanisms and thereby minimizing maintenance problems; and providing a device easy to use, durable in use and economical to manufacture and use.

The novel features which are believed to be characteristic of this invention are set forth with particularity in the appended claims. The invention itself, however, together with further objects and advantages thereof will best be understood by reference to the following description taken in connection with the accompanying drawings, in which:

FIG. 1 is a cross-sectional view of the self-release device showing the assembly of the tool body, the adaptor nut and the locking and releasing elements (to be described later), with the adaptor nut shown locked in place to the tool body;

FIG. 2 is a cross-sectional view of the device with the adaptor nut released from the tool body;

FIG. 3 is a side view of the sleeve shown in FIG. 1;

FIG. 4 is a front view of the sleeve of FIG. 3;

FIG. 5 is a side view of the adaptor nut of FIG. 1;

FIG. 6 is a front view of the adaptor nut of FIG. 5;

FIG. 7 is a side view of the tool body;

FIG. 8 is a front view of the tool body shown in FIG. 7;

FIG. 9 is a side view of the release pin shown in FIG. 1;

FIG. 10 is a cross-section of the release pin of FIG. 9 taken along lines 10—10.

The self-releasing and locking device of the present invention is generally indicated at 10, see FIG. 1. The device 10 includes a tool body 12, a sleeve 16 slidably associated with the tool body 12, and an adaptor nut 20.

The tool body 12 has an outer periphery 22 extending from boss 24 of tool body 12. The outer periphery 22 terminates at a first body shoulder 26. The first body shoulder 26 defines a first body periphery 28 extending from shoulder 26 to and terminating at a second body shoulder 40. The second body shoulder 40 defines a second body periphery 42 which extends from second body shoulder 40 to and terminating at a tool body wall 56, best seen in FIGS. 2 and 7.

The sleeve 16 has a first annular surface 30 with slidably communicates with the outer periphery 22, and which extends and terminates at the first sleeve shoulder 32. The first annular surface 30 and the first body periphery 28 define a sleeve cavity 31 within which a helical sleeve biasing spring 14 is contained. One end of the sleeve biasing spring 14 seats against the first body shoulder 26 and the other end seats against the first sleeve retainer surface 46 which butts up against a sleeve retainer ring 48. The sleeve retainer ring 48 is fixably associated on a semicircular annular groove 50 located on the periphery of the tool body wall 56 of tool body 12. The sleeve biasing spring 14 biases the sleeve 16 to a first normal position defined by the contact of sleeve retainer surface 46 and the sleeve retainer ring 48, as shown in FIG. 1.

The sleeve 16 also has a second annular surface 34, defined between the first sleeve shoulder 32 and the second sleeve shoulder 36. The second annular surface 34 slidably communicates with the first body periphery 28 of tool body 12. Upon moving the sleeve 16 so as to bring the second sleeve shoulder 36 into abutting contact with the second body shoulder 40, a second normal position of the sleeve 16 is then defined, as shown in FIG. 2.

The sleeve 16 also has a third annular surface 38 defined between the second sleeve shoulder 36 and tapered surface 44a. The third annular surface 38 slidably communicates with the second body periphery 42. The tool body 12 also has three bores 58a, (best seen in FIG. 1) 58b, and 58c (best seen in FIG. 8,) the bores being equidistant around the periphery of the second body periphery 42 and each bore extending from the second body periphery 42 thru the tool body wall 56 and terminating in an inner bore radius 60a, 60b, and 60c, respectively. To inner bore 60a defines an opening 62a which has a diameter less than the diameter of the bore 58a. A holding sphere 18a, having a diameter slightly less than the diameter of bore 58a, slidably communicates with the walls of bore 58a, and in the position shown in FIG. 1, a portion of the holding sphere 18a, extends through the opening 62a. A similar situation exists with respect to the bores 58b and 58c which terminate in inner bore radii 60b and 60c, respectively. Also holding spheres 18b and 18c slidably communicate with the walls of bores 58b and 58c, respectively, and a portion of holding spheres 18b and 18c each extending thru the openings 62b and 62c, respectively.

In operation, when the sleeve 16 is moved from its second normal position, (FIG. 2) to its first normal position (shown in FIG. 1), the third annular surface 38 contacts holding spheres 18a, 18b and 18c and forces them in a tight fit relation with the openings 62a, 62b, and 62c. The portion of the holding spheres 18a, 18b and 18c extending through openings 62a, 62b and 62c, respectively, come in tight communicating relation with a semicircular adaptor groove 66 located on the periphery of the boss 70 of the adaptor nut 20 (to be described later). This condition results in the adaptor nut 20 being tightly secured to the tool body 12.

The adaptor nut 20, best seen in FIG. 5, consists of a body section 68 having a boss 70 extending integrally from the surface 72 of the body section 68. The boss 70 terminates with a flange 74 having a tapered edge 76 extending around the periphery of flange 74, the function of this tapered edge to be described later. The boss 70 also has a semicircular adaptor groove 66, extending around the periphery of boss 70, one side of the adaptor groove 66 extending to flange 74. The adaptor nut 20 also has an adaptor opening 78 defined by a annular adaptor threaded surface 80. The adaptor threaded surface 80 is threadably adapted to receive a threaded portion of a tool implement 82. That is, tool implement 82 is screwed into adaptor opening 78 and is non-rotatably fixed to adaptor nut 20 by set screw 84 located on the periphery of body section 68.

The tool body 12 has an adaptor bore 64 having a tool body wall 56, FIGS. 2 and 7. During the assembly of the device the adaptor nut 20 is inserted into the adaptor bore 64 of tool body 12. The periphery surface of flange 74 and boss 70 slidably communicate with the annular surface 65 of adaptor bore 64.

The tool body 12 also has a release bore 86 extending parallel to the axis of tool body 12, and is located within the tool body wall 56. Release bore 86 contains a helical release biasing spring 88 and a release pin 90, best seen in FIGS. 9 and 10. The release bore 86 also has a release opening 92 extending from the second body periphery 42 through the tool body wall 56 and into release bore 86. Associated with the release opening 92 is a locking sphere 94 slidably communicating with the walls of release opening 92, and slidably communicating with a first cam surface 98 and a second cam surface 100 on the release pin 90 (to be described later). In operation, the release biasing spring 88 seats against the release pin surface 104 on one side and against a release bore surface 106 on the other side. In FIG. 1, the release biasing spring 88 is shown in a compressed condition, this being its condition when the sleeve 16 is in its first normal position with the adaptor nut 20 secured to tool body 12. At this point it will be noticed that the third annular surface 38 butts up against locking sphere 94 forcing the locking sphere 94 into contact with the first cam surface 98 of release pin 90. Upon moving the sleeve 16 back to its second normal position shown in FIG. 2, it is seen that upon withdrawal of the adaptor nut 20, the release biasing spring 88 will force the release pin 90 out of release bore 86. While the release pin 90 is being moved out of the bore 86, the release pin 90 will cause the locking sphere 94 to follow the continuous internal cam surface 108 from its position on the first cam surface 98 to the second cam surface 100, as shown in FIG. 2. The second cam surface 100 is designed such that it will force the locking sphere 94 partially through the release opening 92 of the release bore 86. The locking sphere 94 will be prevented from going entirely through opening 92, by the edge of sleeve retainer surface 46. In this position (see FIG. 2) the locking sphere 94 will be locked in place between the second cam surface 100 of release pin 90, and the edge of sleeve retainer surface 46, thereby also locking the sleeve 16 in its second normal position. This second normal position of sleeve 16 will be maintained until the release biasing spring 88, so as to permit the locking sphere 94 to be forced by the edge of sleeve retainer surface 46 to roll, against the continuous internal cam 108, from the second cam surface 100 to the first cam surface 98, thereby releasing the sleeve 16 from its second normal position. When the locking sphere 94 releases the sleeve 16 in this manner, the sleeve biasing spring 14 will force the sleeve 16 back to its first normal position, determined by the location of the sleeve retainer ring 48 on tool body wall 56.

The release pin 90, best seen in FIGS. 9 and 10, is defined by a pin body section 96 having a continuous internal cam surface 108, the cam surface 108 being adapted to receive a cam, spherical in shape, as locking sphere 94. The continuous internal cam surface 108 is defined at one end by a first cam surface 98 which continues up to and terminates in a second cam surface 100. The second cam surface 100 is located close to the release pin surface 104. The second cam surface 100 is also much more shallow than the first cam surface 98, as seen in FIG. 10. This design forces the locking sphere 94 to extend beyond the second body periphery 42 through release opening 92 a sufficient distance while in contact with the second surface 100, so as to interfere with the slidability of sleeve 16 on he tool body 12. When the locking sphere 94 is in contact with the first cam surface 98 no portion of the locking sphere 94 will extend through release opening 92, and therefore will in no way interfere with the slidability of sleeve 16 on the tool body 12.

The sleeve 16 has on its periphery 112, see FIG. 3, gripping grooves 110 which make it possible to better grasp the sleeve 16 manually and to make it easier to move it from the first normal position to the second normal position, thereby preventing a workman's hand from slipping over the outer periphery 112 when grease may be present on the sleeve 16.

The operation of the device can best be described by observing the second normal position of sleeve 16 in FIG. 1, and observing the second normal position of sleeve 16 being locked in that position by locking sphere 94 as shown in FIG. 2. Referring to FIG. 1, it will be seen that when the sleeve 16 is moved back toward boss 24 thereby compressing the sleeve biasing spring 14 to the point where the second sleeve shoulder 36 contacts the second body shoulder 40, two things happen. First, a holding sphere annular cavity 44 having tapered walls 44a and 44b located in the tool body wall 56, will be placed in registration with the three bores 58a, 58b and 58c of tool body 12. Second, the edge of sleeve retainer surface 46 will be moved back past the release opening 92 covering only a small portion of release opening 92, thereby permitting the locking sphere 94 to drop partially by gravity through the release opening 92 and extend past the second body periphery 42. Therefore, when sleeve 16 is moved back toward boss 24 to the point where the second sleeve shoulder contacts the second body shoulder 40 permitting the adaptor nut to be withdrawn from tool body 12, as shown in FIG. 2, the flange 74 will push a portion of the holding spheres 18a, 18b and 18c up into the holding sphere annular cavity 44. At the same time this happens the release biasing spring 88 will push the release pin 90 out of release bore 86 thereby engaging the second cam surface 100 in contact with the locking sphere 94. This will push the locking sphere 94 partially out through release opening 92 into contacting relation with the edge of the sleeve retainer surface 46. This will prevent any further outward movement of the release pin 90 and tightly lock the locking sphere 94 between the second cam surface 100 and the edge of sleeve retainer surface 46. The sleeve 16 will then be locked in the second normal position. Upon totally withdrawing the adaptor nut 20, the holding spheres 18a, 18b and 18c will then fall back by gravity through the bores 58a, 58b and 58c, respectively, and will partially extend through the smaller diameter openings 62a, 62b and 62c, respectively. The tool body 12 is then in a position of readiness to receive and secure another adaptor nut 20.

When another adaptor nut 20 is inserted through the adaptor bore 64, the tapered edge 76 of flange 74 will push the holding spheres 18a, 18b and 18c back up into the holding sphere annular cavity 44. Upon further insertion of the adaptor nut 20 the surface 72 will contact release pin 90 and push the release pin 90 into release bore 86. Moving the release pin 90 in such manner will force the second cam surface 100 out of communication with the locking sphere 94 and move the first cam surface 98 into registration with locking sphere 94. Simultaneously, the semicircular adaptor groove 66 will be placed in registration with the openings 62a, 62b and 62c of tool body 12, thereby permitting the holding spheres 18a, 18b and 18c to fall back and contact semicircular adaptor groove 66.

Since the sleeve 16 is biased to the first normal position by sleeve biasing spring 14, upon the registration of the first cam surface 98 with the locking sphere 94, the edge of sleeve retainer surface 46 will push the locking sphere 94 into communication with the first cam surface 98. At the same time that the sleeve biasing spring is sliding sleeve 16 back to its first normal position, the tapered surface 44a, of holding sphere annular cavity 44, will push the holding spheres 18a, 18b and 18c through the openings 62a, 62b and 62c respectively. When the sleeve 16 reaches the first normal position, the third annular surface 38 will wedge the holding spheres 18a, 18b and 18c into tight communication with the semicircular adaptor groove 66 on adaptor nut 20. When this happens the adaptor nut 20 will be firmly secured to the tool body 12. The tool implement 82 may then be easily screwed into the adaptor threaded surface 80 of adaptor nut 20. The set screw 84, may then be tightened, if desired, to non-rotatably secure the tool implement 82 to adaptor nut 20.

While I have shown and described a specific embodiment of the present invention it will, of course, be understood that other modifications and alternative constructions may be used without departing from the true spirit and scope of this invention. I therefore intend by the appended claims to cover all such modifications and alternative constructions as fall within their true spirit and scope.

What I intend to claim and secure by Letters Patent of the United States, is:

1. A self-release and reload tooling device for removeably securing a tool implement to a tool body comprising:
   sleeve means located on the periphery of the tool body, said sleeve means moveable between a first and second position;
   bias means associated with the tool body to hold said sleeve means in the first position;
   adaptor means operatively associated with the sleeve means such that said adaptor means is removeably insertable into the tool body when the sleeve means is in the second position, said adaptor means holding the tool implement;
   retainer means associated with the tool body to lock said sleeve means on the tool body in the first position, said retainer means being defined by a spherical retaining ring a portion of which is fixably associated on the periphery of the tool body, and the remaining portion intersecting with the sleeve means to lock said sleeve means in the first position;
   first locking means operatively associated with the sleeve means, the tool body, and the adaptor means, to lock the adaptor means to the tool body when the sleeve means is in the first position;
   second locking means associated with the tool body to lock said sleeve means on the tool body in both the first and second position; and
   release means operatively associated with said second locking means, for automatically releasing the sleeve means from the second position to the first position upon the insertion of said adaptor means into the tool body, said release means including a central body portion moveable between first and second release positions and release biasing means mounted within the tool body to biase the release means to said positions, said second locking means and release means defining a lock arrangement in both the first and second sleeve positions.

2. The device as recited in claim 1 wherein the sleeve means includes an indenture located at the interface of said sleeve means and the periphery of the tool body, the indenture capable of receiving a portion of the first locking means and thereby permitting the unlocking of the adaptor means from the tool body when the sleeve means is in the second position.

3. The device as recited in claim 2 wherein the first locking means is a sphere and the second locking means is a sphere.

4. The self-release and reloading device as recited in claim 3 wherein the indenture of the sleeve means is capable of receiving a portion of the first locking means sphere when the sleeve means is in the second position and incapable of receiving any portion of the first locking means sphere when the sleeve means is in the first position.

5. The device as recited in claim 1 wherein the bias means to hold the sleeve means in the first position includes a spring biased to the first position, said spring seating on one side against a first shoulder on the periphery of the tool body and at the other end seating against a first shoulder on the interface of the sleeve means.

6. The device as recited in claim 2 wherein the sleeve means has a second interface shoulder which contacts a second shoulder on the tool body, to limit the sleeve means movement against the biasing means to a predetermined amount, the contacting of said second interface shoulder and the second shoulder on the tool body determined the point of the second position of the sleeve means.

7. The device as recited in claim 6 wherein the release means comprises:
 a central body moveable between a first release position and a second release position;
 a central cam surface located on the central body, communicating with the second locking means sphere when the central body is in the first and the second release positions; and
 a release biasing means removeably contained in the tool body to the second release position, when the sleeve means is in the second position;
 whereupon during movement of the sleeve means from the first position to the second position, the second locking means sphere moves along the central cam surface, said central cam surface forcing the second locking means sphere against the sleeve means to lock the sleeve means in its second position.

8. The device as recited in claim 7 wherein the release biasing means is a spring seated on one end against the tool body and on the other end against the release body.

9. The device as recited in claim 7 wherein the central cam surface comprises:
 a first cam surface located on the central body, communicating with the second locking means sphere when the sleeve means is in the first position; and
 a second cam surface located on the central body and communicating with the second locking means sphere when the sleeve means is moved to the second position.

10. The device as recited in claim 3 wherein the adaptor means comprises:
 a body section;
 a boss extending integrally from the body section;
 an adaptor groove around the periphery of the boss adapted to receive a portion of the first locking means sphere when the sleeve means is in the first position; and
 an adaptor opening extending axially along the body section, having an annular threaded surface which is adapted to receive and secure the tool implement to the body section.

11. The device as recited in claim 10 wherein the adaptor means further includes a set screw associated with the periphery of the body section and penetrating into the adaptor opening for non-rotatably fixing the tool implement to the body section.

* * * * *